United States Patent [19]

Kellerwessel et al.

[11] 4,242,129

[45] Dec. 30, 1980

[54] METHOD OF RECOVERING METALS

[75] Inventors: Hans Kellerwessel, Aachen, Fed. Rep. of Germany; Ernst Kausel, Lima, Peru

[73] Assignee: Klöckner-Humboldt-Wedag AG, Fed. Rep. of Germany

[21] Appl. No.: 909,964

[22] Filed: May 26, 1978

Related U.S. Application Data

[63] Continuation of Ser. No. 759,138, Jan. 13, 1977, abandoned.

[30] Foreign Application Priority Data

Jan. 27, 1976 [DE] Fed. Rep. of Germany ........ 2602849

[51] Int. Cl.³ .............................. C22B 3/00; C22B 3/02
[52] U.S. Cl. ..................................... 75/109; 75/101 R; 75/108; 241/5; 241/20
[58] Field of Search .................. 241/5, 20, 21, 137, 241/153; 75/1 R, 1 T, 2, 101 R, 108, 109, 117

[56] References Cited

U.S. PATENT DOCUMENTS

| 860,661 | 7/1907 | Hendryx | 75/109 |
|---|---|---|---|
| 1,360,666 | 11/1920 | Mills | 75/117 |
| 1,518,828 | 12/1924 | Thornhill et al. | 75/2 |
| 1,820,172 | 8/1931 | Ayer et al. | 75/2 |
| 2,083,031 | 6/1937 | Maclennan | 75/109 |
| 3,282,675 | 11/1966 | Parker | 75/2 |
| 3,457,035 | 7/1969 | Barker | 75/117 |
| 3,514,283 | 5/1970 | Griffith | 75/108 |
| 3,874,940 | 4/1975 | Vera et al. | 75/109 |
| 4,011,146 | 3/1977 | Coltrinari et al. | 423/39 |
| 4,119,699 | 10/1978 | Kellerwessel et al. | 423/DIG. 15 |

FOREIGN PATENT DOCUMENTS

| 2602849 | 2/1978 | Fed. Rep. of Germany | 423/DIG. 15 |
|---|---|---|---|
| 100588 | 11/1916 | United Kingdom | 75/109 |
| 191811 | 1/1967 | U.S.S.R. | 75/117 |
| 490849 | 2/1974 | U.S.S.R. | 75/117 |

OTHER PUBLICATIONS

*Chemical Abstracts Ref.* 108,422y, vol. 70, No. 24 (1969).
Golikov, A. A., et al., "Possibility of Copper Cementation from Cyainde Solutions During Grinding", *Tsvetnyemetally*, vol. 42 (2), pp. 4–6.
Auszüge Deutscher Patentan meldungen, G105,641, VIa, 40a.
Bachmann, D., "Die Entwicklung der Schwingmuhle" in Die Chemische Technik, No. 18, pp. 195-198 (9/42).
Boldt, J., Jr., *The Winning of Nickel Its Geology, Mining and Extractive Metallurgy*, Longmans Ltd., Toronto, pp. 290-297 (1967).

*Primary Examiner*—L. Dewayne Rutledge
*Assistant Examiner*—Michael L. Lewis
*Attorney, Agent, or Firm*—Hill, Van Santen, Steadman, Chiara & Simpson

[57] ABSTRACT

The leaching, precipitation and flotation method of recovering metals from ores is simplified by carrying out the leaching and precipitation steps simultaneously in the same reaction vessel. The method is particularly useful for recovering metals from low grade ores. During the leaching and precipitation step, mechanical comminution of the ore is also effected. The preferred reaction vessel is oscillated and the leaching and precipitation process is continuously effected by passage of the materials through the reaction vessel. The method is particularly suitable for recovering copper from oxygen containing copper ores.

2 Claims, 3 Drawing Figures

METHOD OF RECOVERING METALS

This is a continuation of application Ser. No. 759,138 filed Jan. 13, 1977, now abandoned.

FIELD OF THE INVENTION

This invention relates to the hydrometallurgical extraction of metals from ores involving the steps of grinding the ore, leaching the ground ore with an acid such as sulfuric acid, precipitating the metal out of the leaching solution with a less noble metal and floating the recovered metal in a foam layer. The method of this invention is concerned with the simultaneous and continued leaching and precipitation step, preferably in an oscillating reaction vessel.

PRIOR ART

Metal has heretofore been recovered from low grade ore where the metal content may only be from 0.3 to 3% by hydrometallurgical method. Oxide type copper ores such as the following have been treated by such methods:

Malachite ($CuCO_3$) = Copper-Carbonate
Tenorite (CuO) = Copper-oxide
Cuprite ($Cu_2O$) = Copper-oxide
Chrysocolla ($CuSiO_3$) = Copper-silicate More complex copper ores of the sulfide and oxide type including oxide-chloride combinations can also be treated by these hydrometallurgical extraction methods.

Heretofore, the hydrometallurgical extraction methods involved leaching, precipitation and flotation steps and were generally known as "L-P-F" methods which included the following steps:

Comminution through dry- and/or wet-grinding = (-grinding)
Lixiviation with addition of corresponding solvent-media (for example sulfuric acid) = (Leaching)
Cementing of the metal out of the solution through addition of a corresponding cementation medium = (Cementation) (Precipitation)
Flotation of the metal cement for the separation of metal, slurries and leaching liquid = (Flotation).

In attempting to improve the economy of the "L-P-F" method, pressure-leaching at increased temperature and with gaseous oxidation medium under pulsation were also used and leaching was effected in a ball mill to lessen the leaching time.

SUMMARY OF THIS INVENTION

This invention makes it economically feasible to recover metals from very low grade ores, waste from metallurgical operations, intermediate products with extremely low metallurgical content and the like low grade material which could not be economically treated for ore recovery by known methods. According to this invention, both the lixiviation or leaching step as well as the precipitation or cementation step are undertaken at the same time in one and the same reaction vessel. This vessel preferably swings or oscillates to quickly create an intimate mixture of the liquid and solid phase ingredients leading to an appreciable acceleration of the reaction time. Because of the efficient intermingling of the liquid and solid phases in the oscillating reaction vessel, the leaching and precipitation steps can be carried out continuously by passage of the reagents through the reaction vessel.

Another feature of the invention is the simultaneous mechanical comminution of the metal containing solids during the leaching and precipitation steps with the comminution undertaken with high impact energy by the utilization of inexpensive grinding materials such as pig-iron granules, stampings, particles from cast-metal scraps, pig-iron and ballings or sintered lumps from ore-treating processes.

In the treatment of copper containing ores, concentrates, intermediate products of metallurgical operations, and the like, the grinding bodies are preferably composed of iron, such as iron scraps. The reaction obtained according to this invention in the recovery of metallic copper from oxygen containing copper combinations can be considered as a reaction chain closed in its self where the ingredients react according to the following equations:

The following example sets forth details of a specific embodiment of the invention:

A copper ore is treated with approximately 0.5% copper as sulphide and approximately 0.7% copper in oxidic form. This ore derives from a pre-breakage-installation, which has comminuted it to a grain size of 0/30 mm. The pre-comminuted ore reaches in continuous passage a ball mill, which is produced or made of acid-resistant steel. The ball mill is energized with an oscillatory circuit diameter of approximately 10 mm. at approximately 1000 Rpm. The volume of the mill is filled to about 65% with so-called iron granules. Outside of the ore, at the same time water and concentrated sulphuric acid is likewise continually added. The mixture is so adjusted, that for example, a 5% acid solution is set. The use of the iron-granules is constantly equalized through addition of further granules prorata-temporis. The amount of addition of the ore is so adjusted that a duration of approximately 5 to 10 minutes is insured. Correspondingly, also the charging quantities of the other agents, acid, water and iron granules must be adjusted.

The actual grinding chamber of the ball mill is limited by a wall, which is equipped according to the type of a gap-perforated-bottom with narrow passage slits for the passage of leaching liquid and sludge. This wall separates an outlet chamber from the actual grinding chamber, leaching solution and finished material occurring in this outlet chamber. Through an outlet pipe approximately in the center of the outlet chamber, leaching liquid is continuously drawn off, and recirculated by circulating pump to the charging end of the ball mill. The quantity of liquid circulated each minute corresponds approximately with the volume of liquid in the ball mill. The sludge occurring arrives through an exhaust pipe which is provided with a controllable outlet valve, from the discharge chamber into a collection chamber lying therebelow, which separates the sludge or slurry in leaching liquid and slurry concentrate. The withdrawal of this slurry takes place by means of automatic, level-regulated controls of the outlet member quasi-continuously in small quantities. The leaching liquid becoming free in the collection container by means of sedimentation of the solids (=slurry with low solids-content) is likewise recirculated with the circulating pump in the circuit of the ball mill. The thickened slurry is continuously drawn off from the collection vessel and charged into a flotation unit connected in series, in which in known type and manner, through addition of flotation medium and introduction of air, metallic copper is floated up to a layer of foam and withdrawn. Simultaneously with the metallic copper, however, also the sulphidic portions of copper ore which have not taken part in the leaching- and cementation-process, are also brought out. An essential advantage of the invention consists, among others, therein, that the non-acid-soluble portion of the copper ore is ground in the ball mill functioning simultaneously as reaction vessel and comminution unit—to flotation fineness.

In this manner, a product is recovered, which contains copper cement as well as the undissolved sulphide. This concentrate contains approximately 50 to 60% of copper and is conveyed to a further pyrometallurgical metallurgical process.

Further details and advantages of the invention will be understood from the drawings and following description.

ON THE DRAWINGS

AS SHOWN ON THE DRAWINGS

Figure 1:
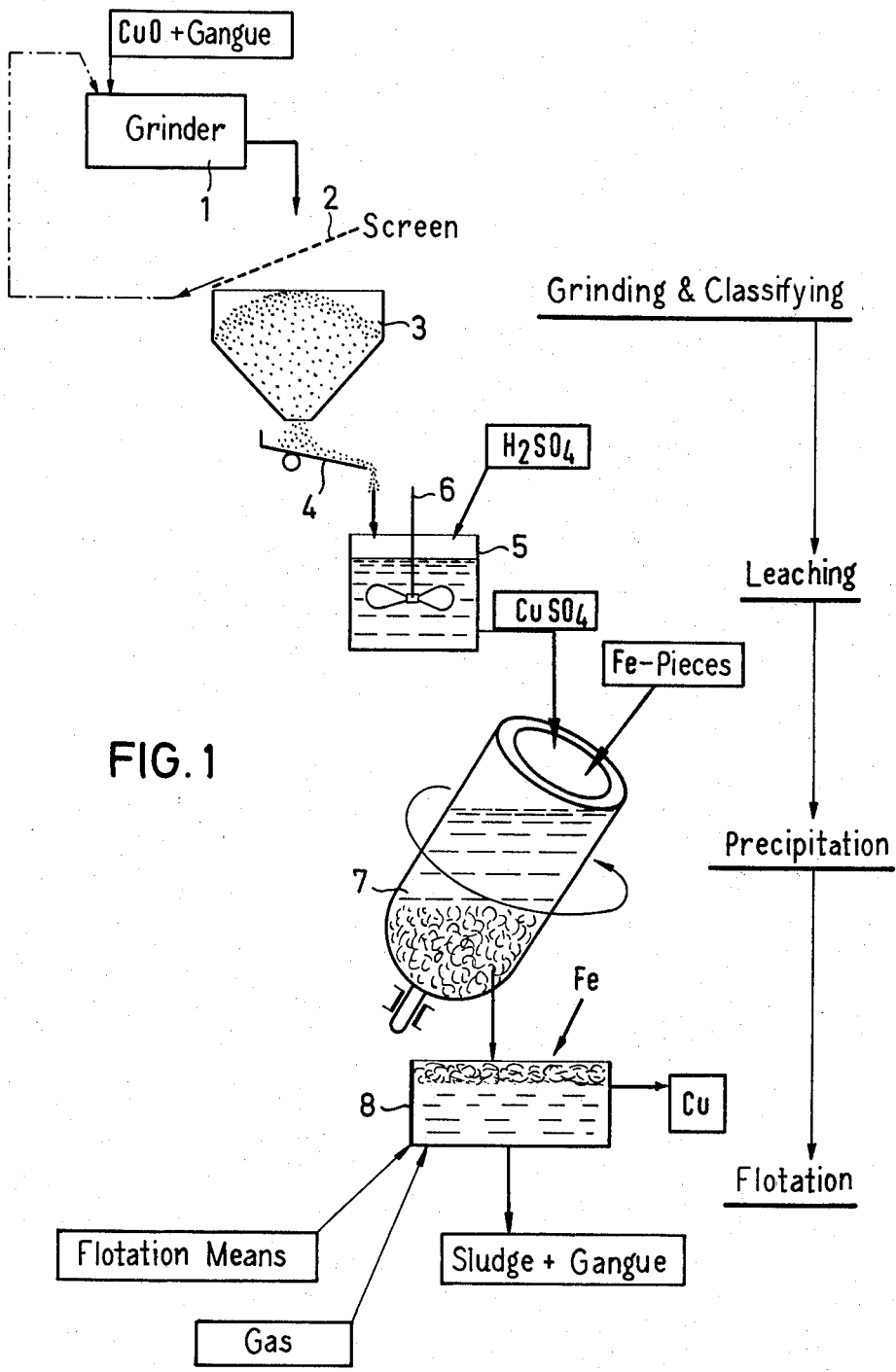
FIG. 1 is a diagrammatic illustration of a system for recovering copper according to the above referred to prior state of the art.

FIG. 1 illustrates the "L.P.F." method of recovering copper from a copper-oxide ore containing about 1% copper. The ore is ground in a mill 1 to flotation-fineness, passes through the sieve 2 which discharges oversized particles which are fed back to the mill. The screened material is collected in a bin 3 from which it is discharged through a dosage type feeder, such as a vibratory hopper 4 at a preset rate. The doses of the ground-in screened ore are fed to a leaching container 5, for example, a leaching-autoclave equipped with an agitator 6. The leaching operation is effected on a batch basis requiring filling of the container 5 with the ground solids, water, and acid for each batch. The leaching operation can occur under pressure and under elevated temperatures with constant agitating movement for a sufficient length of time to react the copper oxide with sulphuric acid to form copper sulphate. This batch process step requires a length leaching treatment of about 120 minutes. Then after the leaching is completed, the copper sulphate solution is drained into a precipitation drum 7 which, as shown, is arranged in an inclined position and rotates about an axis. Iron granules are added to the solution to provide the precipitation medium for bringing about the cementation of the metallic copper in an ion exchange of the electrically baser iron to the electrically more noble metallic copper.

The cementation or precipitation operation in the drum 7 must also be carried out in a batch process with the speed of cementation depending upon concentration of the solution, temperature, speed of agitation and admixed gangue materials and precipitation media. This batch operation likewise requires a long period of time, up to about 120 minutes to complete the cementation.

After completion of the cementation step in the drum 7, the contents of the drum are subjected to a flotation process in flotation cells such as 8. In the flotation process, air and flotation media are added to effect flotation of the metallic copper together with any admixtures of sulphide or chloride copper compounds as a foam to the surface of the cells. The foam is skimmed off and slurries and gangue are separated in a subsequent sedimentation step into acid portion and refuse portions.

Figure 2:
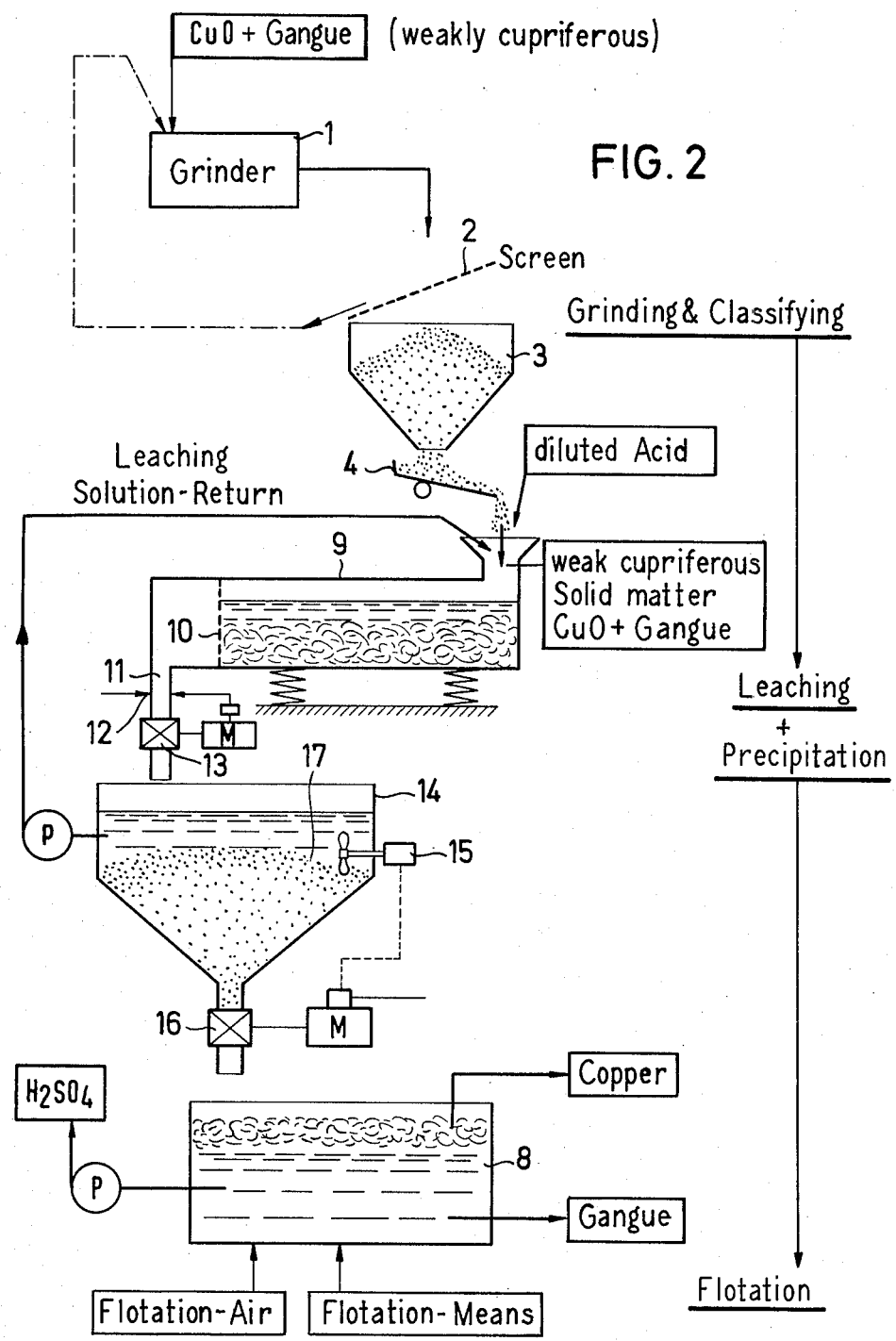
FIG. 2 is a view similar to FIG. 1 but showing the copper recovery system of this invention.

Fig. 2 shows a fundamentally similar method of recovering copper from ore but contrasted with the conventional method of FIG. 1 shows the combined leaching and precipitation or cementation steps in one single reaction vessel according to this invention.

In FIG. 2, copper oxide is ground in the mill 1, screened by the sieve 2, deposited in the hopper 3, discharged by a dosage device 4, and fed to an oscillating reaction vessel 9. Contrasted with the prior art method of FIG. 1, the mill 1 of FIG. 2 need not reduce the ore to flotation fineness and the sieve can be much coarser to lie in the range of from 20 to 30 mm.

The reaction vessel 9 is oscillated at about 15 mm. $\theta$ and at a cycle of about 24 Hertz (corresponding to the rate of rotation of a rotating imbalance of about 1400 Rpm).

The oscillating reaction vessel 9 is filled to about 60% of its capacity with iron granules and the ground ore particles from the dosage device 4 and water and sulphuric acid are added to a concentration of about 5% acid.

In the reaction vessel 9, the reaction chamber is limited by a closure-screen or grid 10 fine enough to prevent passage of the iron particles and undissolved particles of solids, but large enough to permit the copper cement to pass through together with the refuse material all of which is ground to flotation fineness in the reaction vessel 9. The screened material collects in a discharge pipe 11 from which it is discharged under control of a level-measuring device 12 controlling a motor-actuated valve 13 to feed "gulps" or "batches" in succession into the collecting vessel 14.

The collecting vessel 14 functions as a thickner, separating liquid from the solid content of the material received from the discharge pipe 11. A level-indicator for the solids, such as for example, a paddle-indicator 15 actuates a motor-driven outlet member 16 permitting discharge of solids from the container 14 to maintain a level of solids 17 in the container which is relatively constant.

The outlet member 16 discharges to a flotation cell 8 in which the metallic copper and copper combinations are separated from the gangue and the acid solution.

Figure 3:
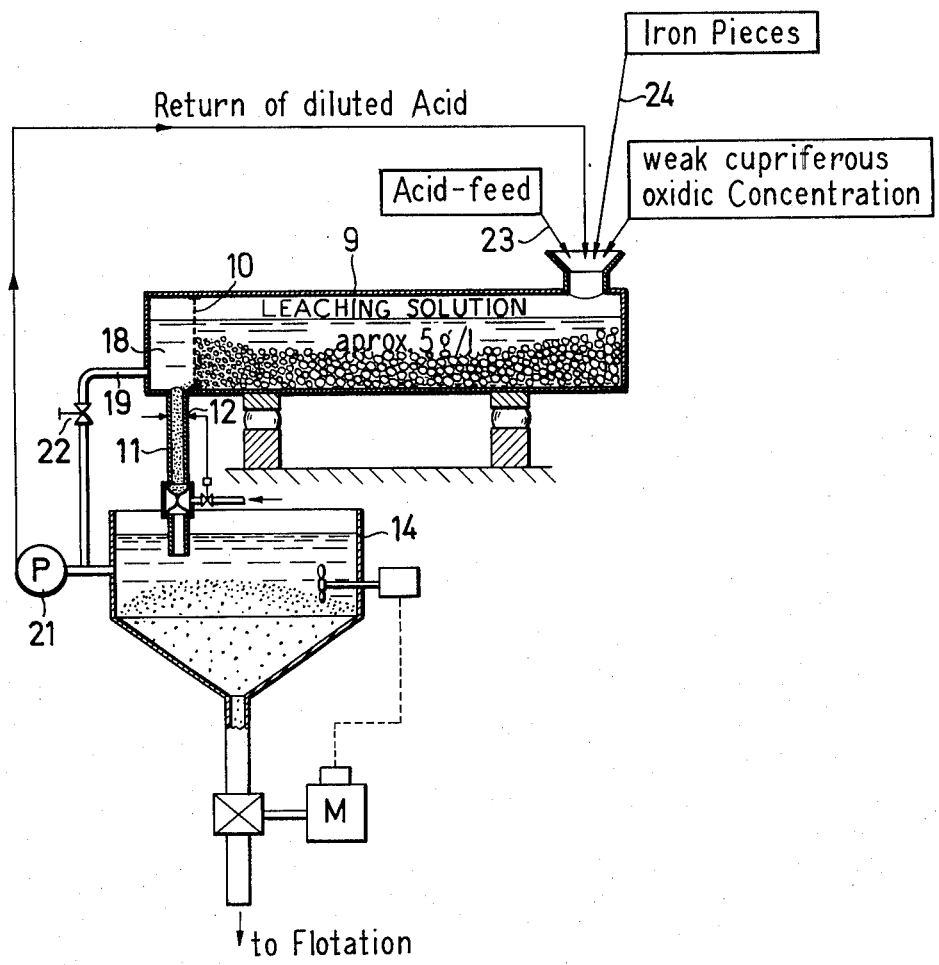
FIG. 3 is a somewhat diagrammatic vertical sectional view of a ball mill arrangement for carrying out the leaching and precipitation steps according to this invention.

FIG. 3 illustrates the reaction vessel 9 in more detail showing a discharge end 18 beyond the screen or grid 10, having a discharge pipe 19 for liquids feeding the suction side of a recirculation pump 21. A regulating valve 22 controls the flow to the pump 21 and the pump 21 continuously circulates the liquid, composed of water and acid to maintain a concentration of the leaching liquid constant in each area of the reaction vessel 9. The acid content is replenished by the addition of fresh acid, as shown by means of the arrow 23, and the iron granules are supplemented by the addition of fresh iron granules as needed, as shown by the arrow 24.

The discharge pipe 11 receives the sludge containing the metal cement and the gangue together with admixtures of copper sulphide or copper halogen combinations and the discharge into the reaction vessel 14 is controlled by the level device 12. The collection vessel 14 operates in the same manner as described in connection with FIG. 2.

An important feature of the process illustrated in FIG. 3 is the control of the feeding of the solids to be treated, as well as the corresponding acid and water portions and the discharge of the solid so that only an average time of about 5 to 10 minutes occurs in passage through the vessel.

From the above description, it will be understood that this invention simplifies and speeds up the recovery of metals from ores and makes economically feasible the recovery of metals from very low grade sources.

It will also be understood that the invention is not limited to the recovery of metal copper from copper-containing ore, but is generally useful in the recovery of metals by leaching and precipitation.

We claim as our invention:

1. The method of recovering copper from low grade copper oxide sources which comprises grinding solid copper oxide source material to a size larger than is suitable for flotation, continuously feeding the ground copper source material through an oscillating reaction vessel, adding an aqueous sulphuric acid leaching solution to the ground copper source material in the reaction vessel, commingling the sulphuric acid leaching solution and the ground copper source material in the reaction vessel with iron grinding bodies effective to precipitate copper from the leaching reaction of the sulphuric acid leaching solution on the ground source material, maintaining the reaction vessel filled to about 60 percent of its capacity with the iron grinding bodies, oscillating the reaction vessel to further grind the copper source material with the iron grinding bodies, to intimately admix the sulphuric acid leaching solution with the copper source material and the iron grinding bodies and to precipitate copper from the sulphuric acid leaching solution, transferring the leaching solution and leached solids from the reaction vessel to a settling tank, retaining the iron grinding bodies in the reaction vessel, settling the solids from the leaching solution in the settling tank, recirculating leaching solution from the settling tank back to the reaction vessel, depositing the settled solids from the settling tank in a flotation cell, and floating off the copper content of the solids as a foam to recover the copper as metallic copper cement.

2. The method of claim 1 wherein the iron grinding bodies are iron balls and the grinding operation in the reaction vessel continually exposes fresh iron surfaces to the leaching solution and copper source material being ground.

* * * * *